N. FENDER.
FREIGHT CAR.
APPLICATION FILED JUNE 29, 1920.
1,377,122.
Patented May 3, 1921.
3 SHEETS—SHEET 3.
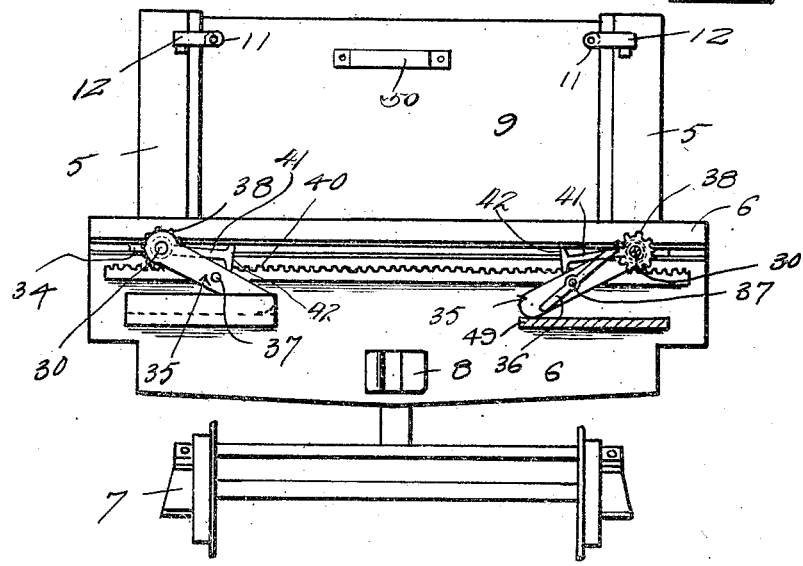
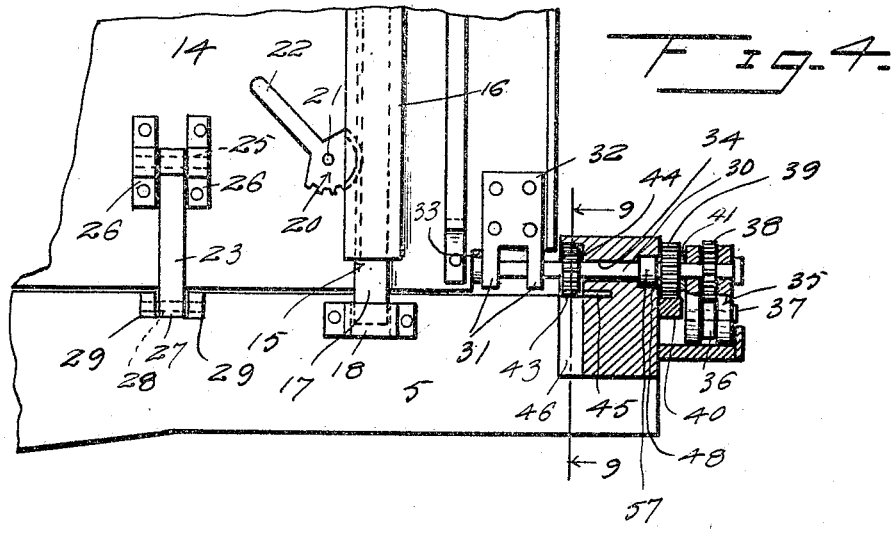
INVENTOR.
N. Fender
BY
ATTORNEY.

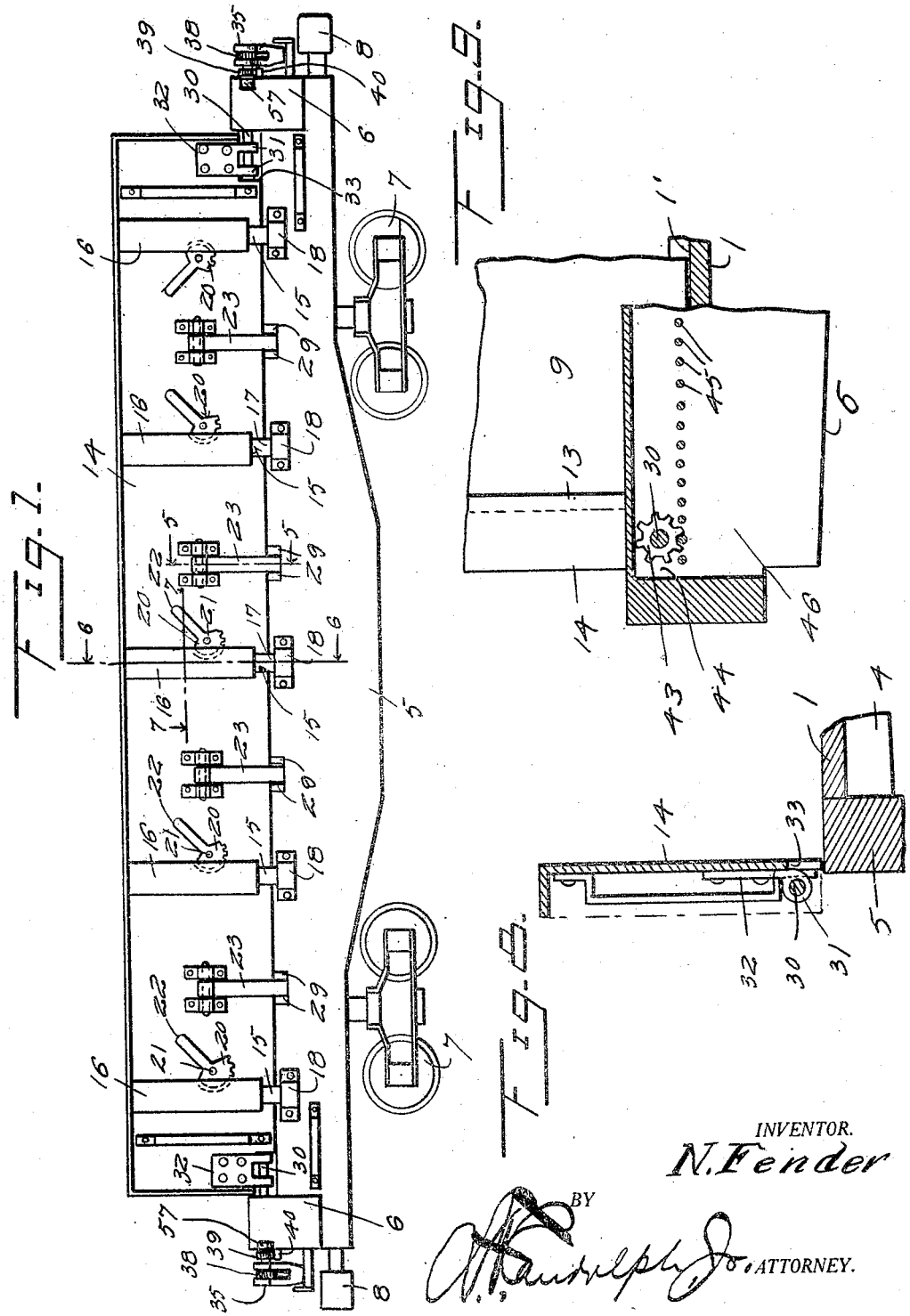

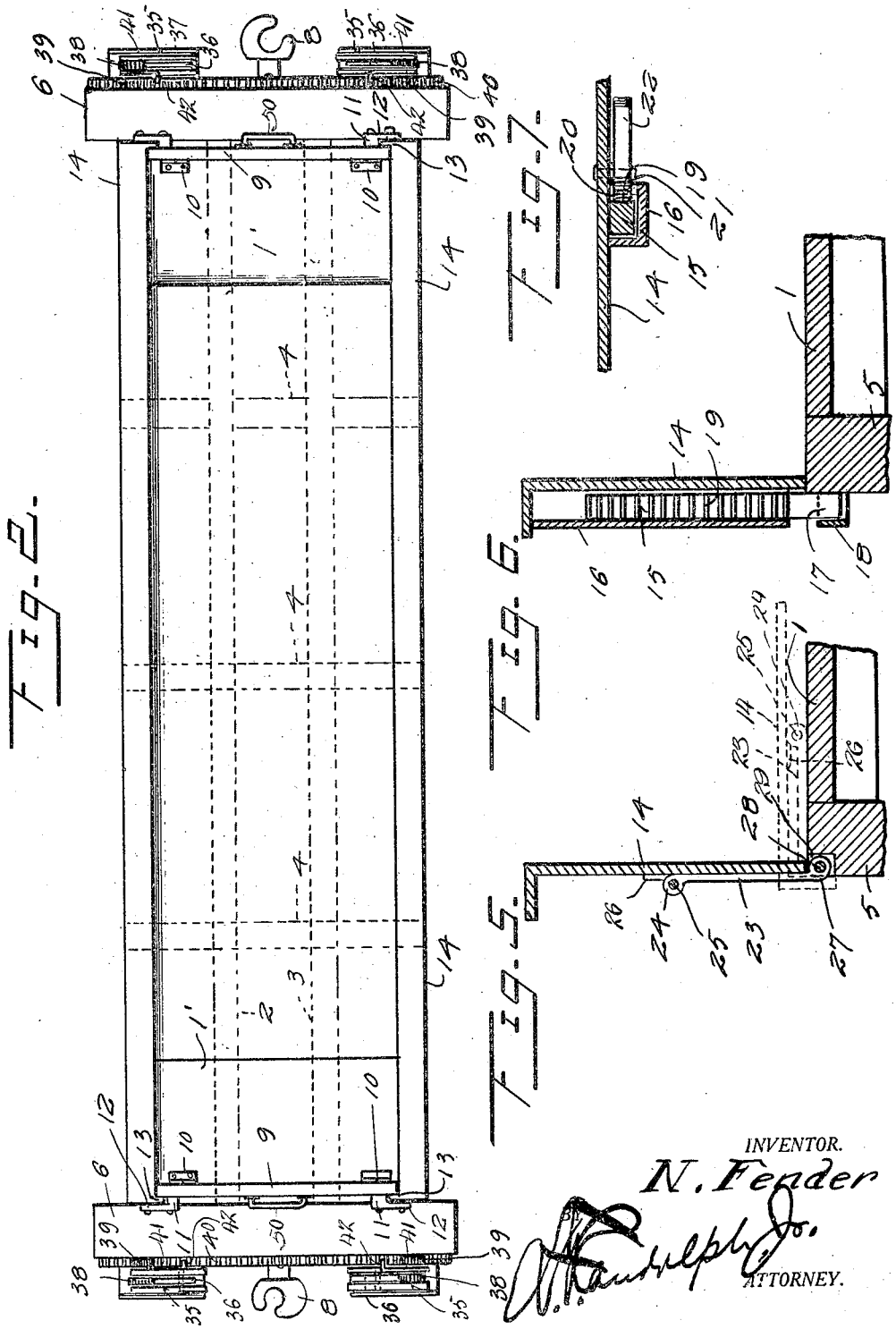

UNITED STATES PATENT OFFICE.

NICHOLAS FENDER, OF CHICAGO, ILLINOIS.

FREIGHT-CAR.

1,377,122.   Specification of Letters Patent.   Patented May 3, 1921.

Application filed June 29, 1920. Serial No. 392,638.

*To all whom it may concern:*

Be it known that I, NICHOLAS FENDER, a citizen of the United States, residing at Chicago, in the county of Cook and State of Illinois, have invented certain new and useful Improvements in a Freight-Car; and I do hereby declare the following to be a full, clear, and exact description of the invention, such as will enable others skilled in the art to which it appertains to make and use the same.

This invention relates to certain new and useful improvements in freight cars and has for its primary object the provision of a car which may be readily converted from a flat car to a "gondola" car when desired, or from a gondola car to a flat car.

The invention has for another object, the provision of a car of the character stated which is designed as an improvement on my car covered by the U. S. Letters Patent No. 1,275,411, granted Aug. 13, 1918, and which will include a supporting structure mounted upon the usual type of trucks, and which forms the bottom for a "gondola" car and which has a pair of shafts extending longitudinally thereof from the opposite edges of each side of the frame and to each of which are connected one side board of the car and which side board may be moved by proper operation of the shafts from a flat horizontal position for forming a bottom member for a flat car into a vertical position along the side of the supporting bottom of the car to form the side of the gondola car.

The invention has for a further object the provision of improved and novel means for coöperation with the side boards means to retain the side boards in a vertical position and also to provide means for locking the shafts against rotation, when desired.

The invention has for a still further object the provision of a freight car of the character stated which will be of such construction that the side boards may be readily supported in either a vertical or horizontal position and the operating shafts therefor relieved of a considerable portion of the strain by hinge members connected with the side boards and serving as supporting means therefor in any of its various positions.

The invention has for a still further object, the provision of a freight car of the character stated which will be constructed in such a manner that the strain upon the various operating and supporting parts will be equally distributed, thereby making it possible for the side members of the car to be readily changed from one position to another by operation of the corresponding shafts at the opposite ends of the body, the end sills of the body being slotted transversely to permit of transverse movement of the side board operating shafts across the ends of the body during the operation of moving the side boards from their vertical to their horizontal positions or vice versa.

The invention has for a still further object, the provision of a freight car of the character stated in which the parts thereof will be of simple construction and operation and the side boards securely held against movement when in either of their positions.

With the foregoing and other objects in view as will appear as the description proceeds, the invention consists in the novel construction, combination and arrangement of coöperating elements as hereinafter more specifically set forth, shown in the accompanying drawings and claimed.

In the drawings forming a part of the present application:

Figure 1 is a side elevation of the improved form of freight car with the side boards and end boards arranged to produce a gondola car.

Fig. 2 is a top plan view of the car shown in Fig. 1.

Fig. 3 is an end elevation thereof.

Fig. 4 is a fragmentary longitudinal vertical section, showing the side board guiding and operating means.

Fig. 5 is a transverse vertical section on the plane of line 5—5 of Fig. 1 of the drawings.

Fig. 6 is a view similar to Fig. 5, taken on the plane of line 6—6 of Fig. 1 of the drawings.

Fig. 7 is a fragmentary detail horizontal section on the plane of line 7—7 of Fig. 1.

Fig. 8 is a detail view showing one of the hinge members for the side boards and the mounting thereof.

Fig. 9 is a detail transverse section on the plane of line 9—9 of Fig. 4, looking in the direction indicated by the arrows.

Referring more in detail to the drawings in which similar reference characters designate corresponding parts throughout the several views, 1 indicates in general the base or bottom of the car, which is braced by a pair of centrally disposed longitudinally extending sills 2 and 3 which are positioned short distances from the longitudinal center of the bottom 1, as clearly shown in the drawings and are in turn braced by transversely extending braces 4 which are positioned at spaced intervals along the car bottom. The sills 2 and 3 and the cross braces 4 are provided for bracing or strengthening the car structure in lieu of the usual brace and sill structure employed for the flat or gondola cars. The bottom 1 is also shown as having side members 5 attached to its longitudinal edges and across the ends of which are extended sills or end members 6 having portions extended above the upper face of the bottom 1. This car body construction may be varied, as desired, however, as the present invention may be applied to various forms of car bodies with but slight if any alteration thereof. The car bottom 1 has the usual form of trucks 7 attached thereto and also the usual type of draw bars 8, as indicated in the accompanying drawings.

The end boards 9 are hinged to the bottom 1 by suitable hinge members 10 adjacent the ends thereof and inwardly of the end sills 6, said end boards 9 being adapted to be folded downwardly in horizontal position within suitable pockets 1' formed in the upper face of the bottom 1 so that the normally outwardly extending faces of the end boards 9 are flush with the main portion of the upper face of the bottom 1 to form continuations thereof when in folded or downwardly extended position.

Suitable latch members 11 are carried by the end boards 9 with extended reduced portions 12 for engagement over the end strips 13 carried by the side boards 14 and against the inner faces of which strips 13 the longitudinal edge portions of the end boards 9 are engaged when the end boards 9 and side boards 14 are locked together in their outwardly extended position to produce the gondola car, as shown in the drawings, particularly Fig. 2. It will be understood that the corner strips 13 are preferably formed of angle iron so that one side thereof may serve as means for limiting outward movement of the end boards 9 and also as means to receive the latch members 11, as just stated.

Each side board 14 is adapted to rest in a vertical position upon one of the side members 5 of the car body when in upright position and outward movement of the side board 14 is prevented by a plurality of locking bolts 15 adapted to slide within the hollow vertical guide members 16 mounted on the outer face of the side board 14 and extended vertically thereof. Each locking bolt 15 has an operating lower end 17 which is adapted to be received in a socket 18 provided therefor on the outer face of the side member 5 when the locking bolt 15 is in its outermost or locked position. Each locking bolt 15 also has rack teeth 19 formed on one longitudinal side edge and with which are engaged the teeth of the segmental operating member 20 pivotally mounted on the outer end of the side board 14, as shown at 21 and extending through an opening provided therefor in the side of the hollow guide member 16. It will be understood that the segmental operating member 20 has a suitable operating handle 22 extended therefrom so that the locking bolt 15 may be readily moved upwardly and downwardly so as to lock the side board 14 in proper position and prevent outward movement thereof or to release the same from the side member 5 and permit the side board 14 to be folded downwardly in a horizontal position upon the inwardly folded end board 9.

Each side board 14 is also provided with a plurality of hinge straps 23 which have eyes 24 formed at their upper ends to receive hinge pins 25 which are also passed through the hinge pin supporting bearings 26 mounted on the outer face of the side board 14 in pairs, as shown in the drawings. The lower end of the hinge straps 23 also terminate in eyes 27 which are loosely mounted on stub shafts 28 having their opposite ends mounted in suitable bearing castings 29 secured in the upper edge of the side member 5, while suitable recesses are provided in the upper edge of the side member 5 to accommodate the eye 27 and permit free swinging movement of the hinge straps 23 upon the stub shaft 28 when the side board 14 is being removed to either its horizontal or vertical position, as will be later clearly understood.

For moving each side board 14 to its various positions I have provided a pair of short longitudinal end shafts 30 which have their inner ends loosely mounted in depending turned portions or eyes 31 of bracket members 32 secured upon the side board 14 adjacent the lower corners thereof, as shown in the drawings, a suitable recess 33 being provided in the lower edge of the side board 14 for each pair of ears 31, as shown in Figs. 4 and 8 of the drawings. Each operating shaft 30 extends through the longitudinally extended transverse slot 34 provided therefor in one of the end sills 6. Each shaft 30 has a bifurcated or two part operating handle 35 mounted rigidly upon its outer end and having a reversible locking pawl 36 pivotally mounted between the divided or separated portions thereof, on a pivot pin 37 so that the point of the locking pawl 36 may be swung in either direction through the handle 35 so as to engage the point or working end of the pawl 36 with the ratchet wheel 38 to either side of the handle 35 and thereby lock the handle 35 with the shaft 30 so that movement of the handle 35 in the proper direction will cause rotation of the shaft 30 in the direction desired to properly swing the side board 14. Each shaft 30 has a gear wheel 39 rigidly mounted thereon outwardly of the end sill 6 and meshing with the rack 40 secured on the outer face of the end sill 6 beneath the slot 34 thereof, as clearly shown in the drawings. It will therefore be seen that as the shaft 30 is rotated by the handle 35, the shaft will be caused to move along the slot 34 either toward the longitudinal center or toward the side edge of the car body, according to the direction of rotation of the shaft 30 and which is governed by the position of the pawl 36, as previously stated. The shaft 30 may also be locked in any position along the slot 34 by means of the double reversible pawl 41 which is loosely mounted on the shaft 30 and may be thrown to either side thereof for one of the operating or working points 42 of the pawl to engage the rack 40. In order to assist in guiding each shaft 30 and preventing the same from turning at an angle with respect to the longitudinal center line of the car body, I have provided for each shaft 30 a sprocket wheel 43 which is rigid therewith and works in the widened or increased inner portion 44 of the slot 34 in the end sill 6. This sprocket wheel 43 engages the spaced roller teeth 45 mounted transversely in the lower side of the portion 44 of the slot 34. It will be understood that by providing the spaced roller teeth 45 for the sprocket wheel 43 to engage, dirt falling on the spaced roller teeth 45 will be permitted to pass therebetween and fall upon the track owing to the open space 46 in the end sill 6 beneath the teeth 45, thereby preventing clogging of the teeth 45 and interfering with movement of the sprocket wheel 43 thereover. In order to relieve the shaft 30 of a portion of the strain to which it is subjected and reduce friction to the minimum, I have provided an anti-friction roller 57 which is loosely mounted on the shaft 30 and rides freely in the widened or increased side portion 48 of the slot 34, as will be readily understood by referring to the drawings.

From the foregoing paragraphs taken in connection with the accompanying drawings, it will be evident that by properly positioning the pawls 36, and then rotating the shaft 30 by means of the handles 35, the side boards 14 may be readily swung to proper position to convert the car into a gondola car or a flat car, as desired. In the latter case, the side boards 14 will be turned or swung upon the hinge straps 23 so that the inner faces thereof will serve as the upper face of the bottom of the flat car. It will be understood that the pair of shafts for each side board should be operated concurrently and as the shafts move transversely of the car toward the longitudinal center line thereof, the side board will swing inwardly at the bottom edge thereof while the upper edge moves outwardly and downwardly until the side board is in its horizontal position to cover over one-half of the main portion of the bottom and the corresponding halves of the inwardly folded end board, with the outer face of the side board positioned downwardly and the inner face positioned upwardly. When the two side boards are swung inwardly in this manner, they form the bottom of the flat car. It will also be evident that the strain will be equally distributed between the hinge straps 23 and the shaft 30 for each side board 14 during swinging movement thereof and the shafts 30 serve to properly guide the side board 14 as the shafts 30 move transversely across the car body.

When the operating handles 35 are not in use they may be readily swung to rest upon the supporting members 49 provided therefor and the outer face of the end sill 6, beneath the ends of the rack 40, mounted thereon. It will also be understood that suitable hand grips 50 are mounted upon the outer faces of the end boards 9 so that these members may be readily moved upon their hinge members 10 to either upright or horizontal position.

It is believed that the complete construction and operation of this invention may now be readily understood by those familiar with this art without further detail description of the various parts. Attention may be directed to the fact, however, that while the preferred embodiment of the invention has been shown and described, minor changes in the details of construction and arrangement of parts may be resorted to within the scope of what is claimed without departing from the spirit of the invention.

What is claimed is:—

1. In a freight car structure, a body including a bottom, end boards adapted to fold over said bottom and form a part thereof when in folded position, side boards adapted to swing over to position upon the folded end boards, operating shafts connected with said side boards and movable transversely of the body to swing the side boards to their horizontal and vertical positions, and hinge straps connected with said side boards and with the car body.

2. In a freight car structure, a body including a bottom, end boards adapted to fold over said bottom and form a part thereof when in folded position, side boards adapted to swing over to position upon the folded end boards, operating shafts connected with said side boards and movable transversely of the body to swing the side boards to their horizontal and vertical positions, hinge straps connected with said side boards and with the car body, and means for locking said side boards in vertical position.

3. In a freight car structure, a body including a bottom, end boards adapted to fold over said bottom and form a part thereof when in folded position, side boards adapted to swing over to position upon the folded end boards, operating shafts connected with said side boards and movable transversely of the body to swing the side boards to their horizontal and vertical positions, hinged straps connected with said side boards and with the car body, operating means for said shafts, means to lock the operating means with said shafts for rotating the latter in either direction, and means for locking said shafts against rotation in either direction.

4. In a freight car structure, a body including a bottom, end boards adapted to fold over said bottom and form a part thereof when in folded position, side boards adapted to swing over to position upon the folded end boards, operating shafts connected with said side boards and movable transversely of the body to swing the side boards to their horizontal and vertical positions, hinge straps connected with said side boards and with the car body, operating means for said shafts, means to lock the operating means with said shafts for rotating the latter in either direction, means for locking said shafts against rotation in either direction, means movably mounted on said side boards for locking the latter against movement with respect to the bottom of the car body at times, and means for controlling the last mentioned means.

5. In a freight car structure, a body including a bottom having recessed portions, end sills mounted across the ends of said bottom, side members depending from the sides of said bottom, end boards hinged upon said bottom and adapted to fold downwardly into the recesses thereof, said end sills having transverse longitudinally extended guide slots formed therein, side boards hinged upon said side members and adapted to swing to horizontal position over the bottom and the folded end boards, means for releasably locking said side boards in upright position upon said side members, operating shafts movable longitudinally in the guide slots of the end sills, means for operating said shafts, means for connecting said shafts in the opposite end sills to said side boards in pairs so that movement of said pairs of shafts in the opposite end sills will cause swinging movement of the side boards, and means for locking said shafts against movement in said end sills.

6. In a freight car structure, a body including a bottom having recesses in its upper face, end sills extended over said bottom and having portions projecting thereabove provided with longitudinal slots, end boards hinged to said bottom inwardly of said end sills and adapted to fold downwardly into the recesses of said bottom with their upper faces flush with the main portion of the upper face of said bottom, side members depending from the sides of said bottom, side boards hinged upon said side members, end shafts for each side board movable longitudinally in the slots of said end sills, the inner ends of said shafts being mounted in brackets carried in the lower corner portions of said side boards whereby movement of said shafts longitudinally of said slots in the end sills will cause swinging movement of said side boards upon their hinges, operating handles for said shafts, supporting members for said handles, means for locking said handles with said shafts, means for locking said shafts at various points along said end sills, means for guiding said shafts and preventing turning thereof with respect to the longitudinal axis of the car body, and means for locking said side boards in upright position upon the side members.

7. In a freight car structure, a body including a bottom, side members depending from the longitudinal edges of said bottom, end boards adapted to fold upon said bottom in such a manner that their upper faces form the end portions of the bottom, side boards mounted on said side members, means for hingedly connecting said side boards with said side members, said hinging means comprising hinge straps, means for mounting the upper end of said hinge straps on the outer faces of said side boards, stub shafts for supporting the lower ends of said straps on the said side members, means for locking said side boards in upright position upon said side members, means for controlling the last mentioned means, and shafts movable transversely of the car body and connected with the ends of the side boards for swinging the latter to vertical and horizontal position when the locking means for the side boards is in inoperative position.

8. In a freight car structure, a body comprising a bottom, side members depending from said bottom, end sills for said body, end boards hinged upon said bottom and adapted to be folded thereon, side boards hinged to said side members, longitudinally moving locking bolts mounted on said side members, inclosing and guiding means for said bolts located on the outer faces of said side boards, socket members carried by said side members to receive the ends of said locking bolts, pivotally mounted operating members engaged with said locking bolts to move the same to operative and inoperative positions, means connected with the lower corners of said side boards and movable in the end sills of the car body to swing said side boards to vertical and horizontal positions, and means for controlling operation of the last mentioned means.

9. In a freight car structure, a body including a bottom, end boards hinged to said bottom and adapted to be folded inwardly and downwardly upon the same, end sills outwardly of said end boards and provided with transverse slots, stub shafts adapted to roll along said slots toward the longitudinal center line and toward the opposite sides of the car, rack bars extended longitudinally of said end sills beneath said slots, gear wheels mounted on said stub shafts and adapted to ride on said rack bars, means carried by said stub shafts for engagement with said rack bar to lock said stub shafts at various points along said slots, side boards having their opposite lower corner portions connected with said stub shafts, whereby said side boards may be folded inwardly and downwardly upon the bottom of the car and upon the inwardly and downwardly folded end boards with the outer faces of said side boards positioned upwardly, hinge connections between said side boards and the longitudinal edge portions of said bottom, and means for locking said side boards in upright position at times.

In testimony whereof I affix my signature in presence of two witnesses.

NICHOLAS FENDER.

Witnesses:
BENNETT S. JONES,
WM. S. FOWLER.